United States Patent
O'Doherty et al.

(10) Patent No.: US 10,320,926 B2
(45) Date of Patent: Jun. 11, 2019

(54) MODIFYING APPLICATION FUNCTIONALITY BASED ON USAGE PATTERNS OF OTHER USERS

(71) Applicant: International Business Machines Corporation, Armonk, NY (US)

(72) Inventors: Simon P. O'Doherty, Dublin (IE); Di Wu, Beijing (CN); Huan Zhang, Beijing (CN); WuMi Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 14/854,743

(22) Filed: Sep. 15, 2015

(65) Prior Publication Data
US 2017/0075506 A1    Mar. 16, 2017

(51) Int. Cl.
*G06F 3/00* (2006.01)
*H04L 29/08* (2006.01)
*G06F 9/44* (2018.01)

(52) U.S. Cl.
CPC .............. *H04L 67/22* (2013.01); *G06F 9/44* (2013.01); *H04L 67/34* (2013.01)

(58) Field of Classification Search
CPC ............ H04L 67/22; H04L 67/34; G06F 9/44
See application file for complete search history.

(56) References Cited

U.S. PATENT DOCUMENTS

| | | | | |
|---|---|---|---|---|
| 7,574,661 | B2 * | 8/2009 | Matsuura | G06Q 10/10 455/414.1 |
| 7,861,178 | B2 | 12/2010 | Lui et al. | |
| 7,865,828 | B1 | 1/2011 | Hanson, II et al. | |
| 7,865,841 | B2 * | 1/2011 | Morikawa | G06F 3/0482 706/14 |
| 7,870,491 | B1 * | 1/2011 | Henderson | G06F 9/4446 715/745 |
| 8,024,660 | B1 * | 9/2011 | Quinn | G06F 9/4446 715/745 |
| 8,214,767 | B2 * | 7/2012 | Sridhar | G06F 3/048 715/704 |

(Continued)

OTHER PUBLICATIONS

Guzdial, Mark; "Deriving Software Usage Patterns from Log Files"; SMARTech; Georgia Institute of Technology; 1993; pp. 1-3; <https://smartech.gatech.edu/handle/1853/3650>.

(Continued)

*Primary Examiner* — Anil N Kumar
(74) *Attorney, Agent, or Firm* — Edward J. Wixted, III

(57) ABSTRACT

In an approach for modifying a user interface for a user of an application, a processor receives a plurality of actions for a user of an application. A processor generates a unique identifier for each action of the plurality of actions. A processor generates a unique string of the generated unique identifiers for each action of the plurality of actions. A processor determines that a portion of a pattern of the unique string matches, within a predetermined threshold, a portion of a pattern of a history of usage of a set of users of the application. A processor modifies a user interface of the application, for the user, based on the portion of the pattern of the matched unique string, within the predetermined threshold, the portion of the pattern of the history of usage.

14 Claims, 3 Drawing Sheets

(56) References Cited

U.S. PATENT DOCUMENTS

| | | | |
|---|---|---|---|
| RE44,966 E | | 6/2014 | Flinn et al. |
| 8,856,670 B1 * | | 10/2014 | Thakur ................. G06F 9/4443 715/747 |
| 9,501,762 B2 * | | 11/2016 | Babenko ........... G06F 17/30017 |
| 2009/0138292 A1 | | 5/2009 | Dusi et al. |
| 2010/0281364 A1 * | | 11/2010 | Sidman ............. G06F 17/30595 715/713 |
| 2010/0333063 A1 | | 12/2010 | Malkin et al. |
| 2012/0089919 A1 | | 4/2012 | Kennedy et al. |

OTHER PUBLICATIONS

Mackay, Wendy E.; "Patterns of Sharing Customizable Software"; CSCW 90 Proceedings; Oct. 1990; pp. 209-221.

\* cited by examiner

MODIFYING APPLICATION FUNCTIONALITY BASED ON USAGE PATTERNS OF OTHER USERS

BACKGROUND

The present invention relates generally to the field of application functionality, and more particularly to modifying the user interface of a user using an application based on usage patterns of other users using the same application.

Application software (i.e., an application) is a set of computer programs designed to permit a user to perform a group of coordinated functions, tasks, or activities. Application software is dependent on system software to execute. Examples of an application include, but are not limited to: a word processor, a spreadsheet design and management system, a console game, or a library management system.

In information technology (IT), functionality is the sum or any aspect of what a product, such as a software application or computing device, can do for a user. A product's functionality may be used by marketers to identify product features and enables a user to have a set of capabilities in reference to the product. Functionality may be easy to use or may be very complex.

SUMMARY

Aspects of an embodiment of the present invention disclose a method, computer program product, and computer system for modifying a user interface for a user of an application. A processor receives a plurality of actions for a user of an application. A processor generates a unique identifier for each action of the plurality of actions. A processor generates a unique string of the generated unique identifiers for each action of the plurality of actions. A processor determines that a portion of a pattern of the unique string matches, within a predetermined threshold, a portion of a pattern of a history of usage of a set of users of the application. A processor modifies a user interface of the application, for the user, based on the portion of the pattern of the matched unique string, within the predetermined threshold, the portion of the pattern of the history of usage.

DETAILED DESCRIPTION

With the current state of computer applications, complexity normally requires a large learning curve for end users. Also, with many applications, only a small subset of features are normally used by end users. The additional features are usually used by different demographics of people.

Embodiments of the present invention recognize the learning material is often created by someone not actively using the product for a particular demographic, which can lead to time wasted on training material that is never read. Additionally, the terminology used may not resonate with the demographic using the product.

Embodiments of the present invention recognize that by hooking into existing social systems, it is possible to create a product that trains users based on the existing users of a particular demographic, which helps generate documentation on common features and how the common features are used. Embodiments of the present invention recognize that a solution would be to analyze the nature of data content of the application and the workflow and cross reference the analysis to social media references of the application and how everything equates to the current user. Embodiments of the present invention also pick up on workflow repetition and suggests documenting the process, as well as mask, remove, or move features based on the social group input.

Embodiments of the present invention can be applied to any application that has some level of workflow and data contained within. Unlike workflow systems within the current state of computer applications, the workflow within the present invention is not predefined, rather, by using a matching system, embodiments of the present invention can predict possible duplicated workflows and act on the predictions. Embodiments of the present invention detail a program that can be used to modify the user interface of a user using an application based on usage patterns of other users using the same application.

Embodiments of the present invention will now be described in detail with reference to the Figures.

Figure 1:
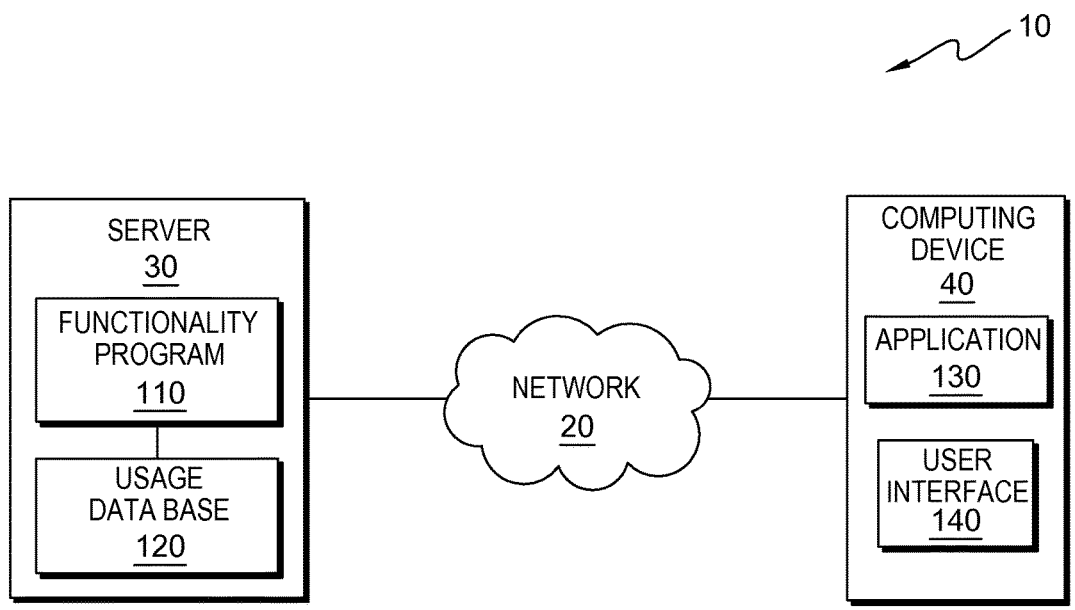
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains functionality program 110 and usage database 120. In other embodiments, server 30 may include other components, as depicted and described in further detail with respect to FIG. 3.

Computing device 40 may be a desktop computer, laptop computer, netbook computer, or tablet computer. In general, computing device 40 may be any electronic device or computing system capable of processing program instructions, sending and receiving data, and communicating with server 30 via network 20. In the depicted embodiment, computing device 40 contains application 130 and user interface 140. In other embodiments, computing device 40 may include other components, as depicted and described in further detail with respect to FIG. 3.

Functionality program 110 modifies the user interface of a user using an application based on usage patterns of other users using the same application. In doing so, functionality program 110 generates a unique identifier. Functionality program 110 generates a unique string. Functionality program 110 scans the entered data. Functionality program 110 creates a hash. Functionality program 110 determines whether there is any form of repetition. Functionality program 110 suggests documentation. Functionality program 110 determines whether the suggested documentation is selected (or accepted). Functionality program 110 generates or updates a wiki page. Functionality program 110 modifies the user interface. In the depicted embodiment, functionality program 110 resides on server 30. In other embodiments, functionality program 110 may reside on another server or another computing device, provided that functionality program 110 can access usage database 120, application 130, and user interface 140 via network 20.

Usage database 120 may be a repository that may be written to and/or read by functionality program 110. In some embodiments, a program (not shown) may allow an administrator or other user to define various functionalities of an application and store the various functionalities of an application to usage database 120. In other embodiments, usage database 120 may store already determined usage patterns of other users. For example, if a usage pattern for one user is matched to other usage patterns of other users, then functionality program 110 can suggest that usage pattern to other users. In the depicted embodiment, usage database 120 resides on server 30. In other embodiments, usage database 120 may reside on another server or another computing device, provided that usage database 120 is accessible to functionality program 110 via network 20.

Application 130 may be any application or program on computing device 40 that may be accessed by functionality program 110 over network 20. For example, application 130 may be an application or program designed to permit a user to perform a group of coordinated functions, tasks, or activities. Functionality program 110 may use a user's usage patterns of application 130 to suggest those same usage patterns to other users who may be using application 130 on another computing device. In the depicted embodiment, application 130 resides on computing device 40. In other embodiments, application 130 may reside on another computing device or another server, provided that application 130 is accessible to functionality program 110 via network 20.

User interface 140 may be any user interface used to access information from server 30, such as information gathered or produced by functionality program 110. In some embodiments, user interface 140 may be a generic web browser used to retrieve, present, and negotiate information resources from the Internet. In other embodiments, user interface 140 may be a software program or application that enables a user at computing device 40 to access server 30 over network 20. In the depicted embodiment, user interface 140 resides on computing device 40. In other embodiments, user interface 140, or similar user interfaces, may reside on another computing device or another server, provided that user interface 140 is accessible to application 130 and functionality program 110.

Figure 2:
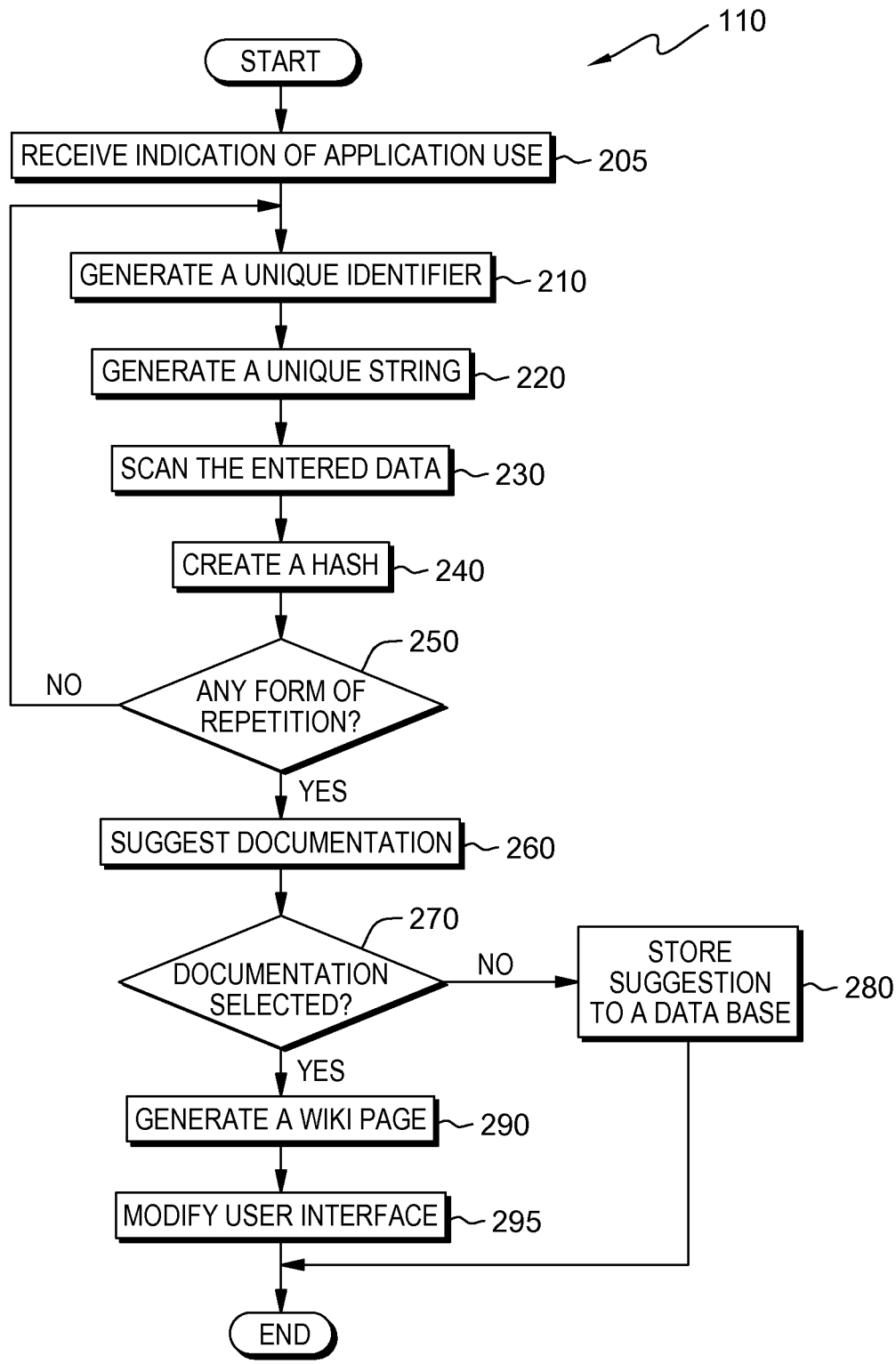
FIG. 2 depicts a flowchart of the steps of a functionality program, executing within the computing system of FIG. 1, for modifying the user interface of a user using an application based on usage patterns of other users using the same application, in accordance with an embodiment of the present invention.

FIG. 2 depicts a flowchart of the steps of a functionality program, executing within the computing system of FIG. 1, in accordance with an embodiment of the present invention. Functionality program 110 modifies the user interface of a user using an application based on usage patterns of other users using the same application.

In step 205, functionality program 110 receives an indication of use of application 130. In one embodiment, the indication includes functional actions by a user. In some embodiments, the indication includes data entered by a user. In other embodiments, the indication includes functional actions and data entered by a user.

In step 210, functionality program 110 generates a unique identifier of the functions used and/or data entered from application 130. In the beginning, a user uses application 130 as it was intended to be used. As the user uses the functions of application 130 and/or enters data into application 130, functionality program 110 uses the results (functions used and/or data entered) from application 130 and generates a unique identifier of the functions used and/or data entered. With reference to a given set of objects (a location in memory having a value, e.g., a variable, data structure, or function), a unique identifier is any identifier which is guaranteed to be unique among all identifiers used for those objects and for a specific purpose. There are three main types of unique identifiers, each corresponding to a different generation strategy: (1) serial numbers, assigned incrementally; (2) random numbers, selected from a number space much larger than the maximum (or expected) number of objects identified; and (3) names or codes allocated by choice that are forced to be unique by keeping a central registry, such as the Electronic Product Code Information Services (EPCIS). A serial number is a unique code assigned for identification of a single unit. Although usually called a number, a serial number may include letters, though ending with numbers. Typically, serial numbers of a production run are incremented by one, or another fixed difference, from one unit to the next. Random numbers are selected from a random number generator, which is a computational or physical device designed to generate a sequence of numbers or symbols that lack any pattern, i.e., appear random.

In one embodiment, functionality program 110 generates a unique identifier for the functional actions of the user. In some embodiments, functionality program 110 generates a unique identifier for the data entered by the user. In other embodiments, functionality program 110 generates a unique identifier for, both, the functional actions of the user and the data entered by the user. The unique identifiers are building blocks to make up a workflow, or usage pattern, for the user using application 130.

In one embodiment, if a second user performs the exact same action, the action receives a different unique identifier. In some embodiments, if a second user performs the exact same action, the action is assigned a previously existing identifier corresponding to that action.

In step 220, functionality program 110 generates a unique string. The unique string is made up of multiple unique identifiers, performed one after another by a user (i.e., in succession), generated in step 210. In one embodiment, the unique string includes unique identifiers for the functional actions of the user. In some embodiments, the unique string includes unique identifiers for the data entered by the user. In other embodiments, the unique string includes, both, the functional actions of the user and the data entered by the user. The unique string is, actually, a workflow, or usage pattern, for the user using application 130.

In step 230, functionality program 110 scans the entered data. The data is scanned for related concepts of the entered data and structure of the entered data, e.g., paragraphs v. bullets. The emphasis is on the content and how the content would relate to a particular domain of how the application 130 is being used (e.g., a doctor using the application vs. a lawyer using the application). In one embodiment, functionality program 110 scans the entered data using natural language processing techniques. Natural language processing is concerned with the interactions between computers and human (natural) languages. Examples of natural language processing tasks include, but are not limited to: parsing, optical character recognition, and sentence breaking. In some embodiments, functionality program 110 scans the entered data using machine learning techniques. Machine learning explores the construction and study of algorithms that can learn from and make predictions on data. Such algorithms operate by building a model from example inputs in order to make data-driven predictions or decisions, rather than following strictly static program instructions. Examples of machine learning algorithms include, but are not limited to: decision tree learning, association rule learning, and clustering. In other embodiments, functionality program 110 scans the entered data using natural language processing algorithms based on machine learning—sometimes statistical machine learning. There are some advantages of using natural language processing algorithms based on machine learning. The advantages include, but are not limited to: (1) the learning procedures used during machine learning automatically focus on the most common cases, whereas when writing rules by hand, it is often not obvious where the effort should be directed; (2) automatic learning procedures can make use of statistical inference algorithms to produce models that are robust to unfamiliar input (e.g., containing words or structures that have not been seen before) and erroneous input (e.g., with misspelled words or words accidentally omitted); and (3) systems based on automatically learning the rules can be made more accurate simply by supplying more input data, while systems based on hand-written rules can only be made more accurate by increasing the complexity of the rules.

In step 240, functionality program 110 creates a hash. Functionality program 110 does a one-way hash of the domain terms to offset possible knowledge extraction from the hashes when stored for querying externally. A hash function is any function that can be used to map digital data of an arbitrary size to digital data of a fixed size. The values returned by a hash function are called hash values, hash codes, hash sums, or simply hashes. One use is a data structure called a hash table, used for rapid data lookup. Hash functions accelerate table or database lookup by detecting duplicated records in a large file. In one embodiment, functionality program 110 scans the entered data and uses a hash function to create a hash, based on the scanned entered data. A one-way hash is an algorithm that turns messages or text into a fixed string of digits, usually for security or data management purposes. The one-way means that it is nearly impossible to derive the original text from the string. A one-way hash function is used to create digital signatures, which in turn identify and authenticate the sender and message of a digitally distributed message.

In decision 250, functionality program 110 determines whether there are any forms of repetition in usage patterns in the workflow. Functionality program 110 determines whether there are any forms of repetition by using a minimum distance algorithm across the entire history of usage, which will match the unique strings, or usage patterns, of the user using application 130 to patterns in the history of usage of application 130. If functionality program 110 determines there are no forms of repetition (decision 250, no branch), functionality program 110, in one embodiment, generates a unique identifier (step 210). In other embodiments, there is a predetermined threshold for the number of times that functionality program 110 will restart to step 210 before functionality program 110 will end. For example, if nine is the predetermined threshold for the number of times that functionality program 110 will restart to step 210 after it is determined that there are no forms of repetition, then functionality program 110 will end after the tenth time that it is determined that there are no forms of repetition. If functionality program 110 determines there are forms of repetition (decision 250, yes branch), functionality program 110 suggests documentation (step 260).

In one embodiment, the repetition in usage patterns in the workflow is for a single user. In some embodiments, the repetition in usage patterns in the workflow if viewed among multiple users.

In one embodiment, functionality program 110 looks for patterns within the workflows. In other embodiments, functionality program 110 looks for anti-patterns within the workflows. An anti-pattern is a common response to a recurring problem that is usually ineffective and risks being highly counterproductive. The matching is similar, except that functionality program 110 looks for reversions of the entered data, such as redo/undo usage. Reversion is the abandonment of one or more recent changes in favor of a return to a previous version of the material at hand. Functionality program 110 attempts to match based on possible matching workflow patterns within the network of application 130 and within any social networks of the user.

In step 260, functionality program 110 suggests documentation. In one embodiment, functionality program 110 suggests documentation of the workflows when reproduced patterns are found to be duplicated in the workflow of application 130. In some embodiments, functionality program 110 suggests documentation of the workflows when reproduced patterns are found to be duplicated in the workflow of application 130, based on a predetermined threshold of number of duplications. For example, if the predetermined threshold is five, then functionality program 110 will not suggest documentation if there are reproduced patterns that are duplicated four times in the workflow of application 130. On the other hand, if there are reproduced patterns that are duplicated six times in the workflow of application 130, then functionality program 110 will suggest documentation.

In one embodiment, functionality program 110 suggests documentation of the workflows by showing the user a video of the steps within the patterns and a choice to anonymize the entered data. Data anonymization is a type of information sanitization whose intent is privacy protection. Data anonymization is the process of either encrypting or removing personally identifiable information from data sets, so that the people whom the data describe remain anonymous. In other embodiments, when seeking anti-patterns, functionality program 110 suggests documentation of the workflows, either by a video or a link to the wiki page generated in step 290.

The suggested workflows can be documented based on the popularity of the workflow. In one embodiment, the popularity is determined using a predetermined threshold number of votes of users using the workflow within application 130. For example, if the predetermined threshold is a yes vote of 75% of the users using the workflow within application 130, then the suggested workflows are documented when there is a yes vote of 75% or more of the users using the workflow within application 130. In other embodiments, the popularity is determined using a predetermined threshold number of users using the workflow within application 130. For example, if the predetermined threshold is 50 users, then the suggested workflows will be documented when there are 50 or more users using the workflow within application 130. The documentation of the workflow of an anti-pattern allows for misbehaving workflows to be ignored or discarded.

In one embodiment, functionality program 110 sets the application 130 to accept formatting of the user interface 140, based on common workflow patterns/functions. In some embodiments, functionality program 110 allows the user to set the application 130 to accept formatting of the user interface 140, based on common workflow patterns/functions. The formatting of the user interface 140 can change dynamically as concept nodes are being created. For example, certain options within user interface 140 become faded as the social/concept networks of the user use the certain options less frequently. Furthermore, common patterns/functions can become part of the user interface 140, based on the popularity (e.g., votes, usage, etc.) in relation to the social/concept networks of the user.

In decision 270, functionality program 110 determines whether the suggested documentation is selected. Functionality program 110 determines whether the suggested documentation is selected by, either, receiving an indication that a user selected the suggested documentation or from a predetermined mode of acceptance or rejection. In one embodiment, functionality program 110 allows a user to choose whether or not to select the suggestion of documentation. In some embodiments, functionality program 110 selects the suggestion of documentation. In other embodiments, functionality program 110 automatically selects the suggestion of documentation. Still, in some embodiments, functionality program 110 automatically rejects the suggestion of documentation. If functionality program 110 determines the suggested documentation is not selected (decision 270, no branch), functionality program 110 stores the suggestion to a database, such as usage database 120 (step 280). If functionality program 110 determines the suggested documentation is selected (decision 270, yes branch), functionality program 110 generates a wiki page (step 290).

In step 290, functionality program 110 generates a wiki page. A wiki is an application, typically a web application, which allows collaborative modification, extension, or deletion of its content and structure. In some embodiments, the text in a wiki is written using a simplified markup language or a rich-text editor. A wiki is a type of content management system where the content is created without a defined owner or leader; wikis have little implicit structure, allowing structure to emerge according to the needs of the users. In some embodiments, the wiki permits control over different functions (i.e., levels of access). For example, editing rights may permit changing, adding, or removing material. In other embodiments, the wiki may permit access without enforcing access control. Still, in some embodiments, other predetermined rules may be imposed to organize content.

In one embodiment, functionality program 110 generates the wiki page, defined by functionality program 110. If the wiki page is defined by functionality program 110 and the user's workflow is complex, functionality program 110 can define an encrypted version of the wiki page that allows for micro transactions for usage or implementation. In some embodiments, functionality program 110 generates the wiki page, defined by an administrator. If the wiki page is defined by an administrator and the user's workflow is complex, the administrator can define an encrypted version of the wiki page that allows for micro transactions for usage or implementation. In one embodiment, functionality program 110 attaches a reference to the related steps within the application 130 of the user. The wiki page is generated for the purpose of assisting users of application 130, as well as developers of future versions of application 130, to have a better understanding of various uses and functionalities of application 130 and includes improvements of current functionalities based on the usage patterns of other users.

In step 295, functionality program 110 modifies the user interface 140. In one embodiment, the user can set application 130 to accept modifications of the user interface 140 from functionality program 110. In some embodiments, modifications of the user interface 140 from functionality program 110 are automatic. The modifications are based on common workflow usage patterns related to the user's domain.

Figure 3:
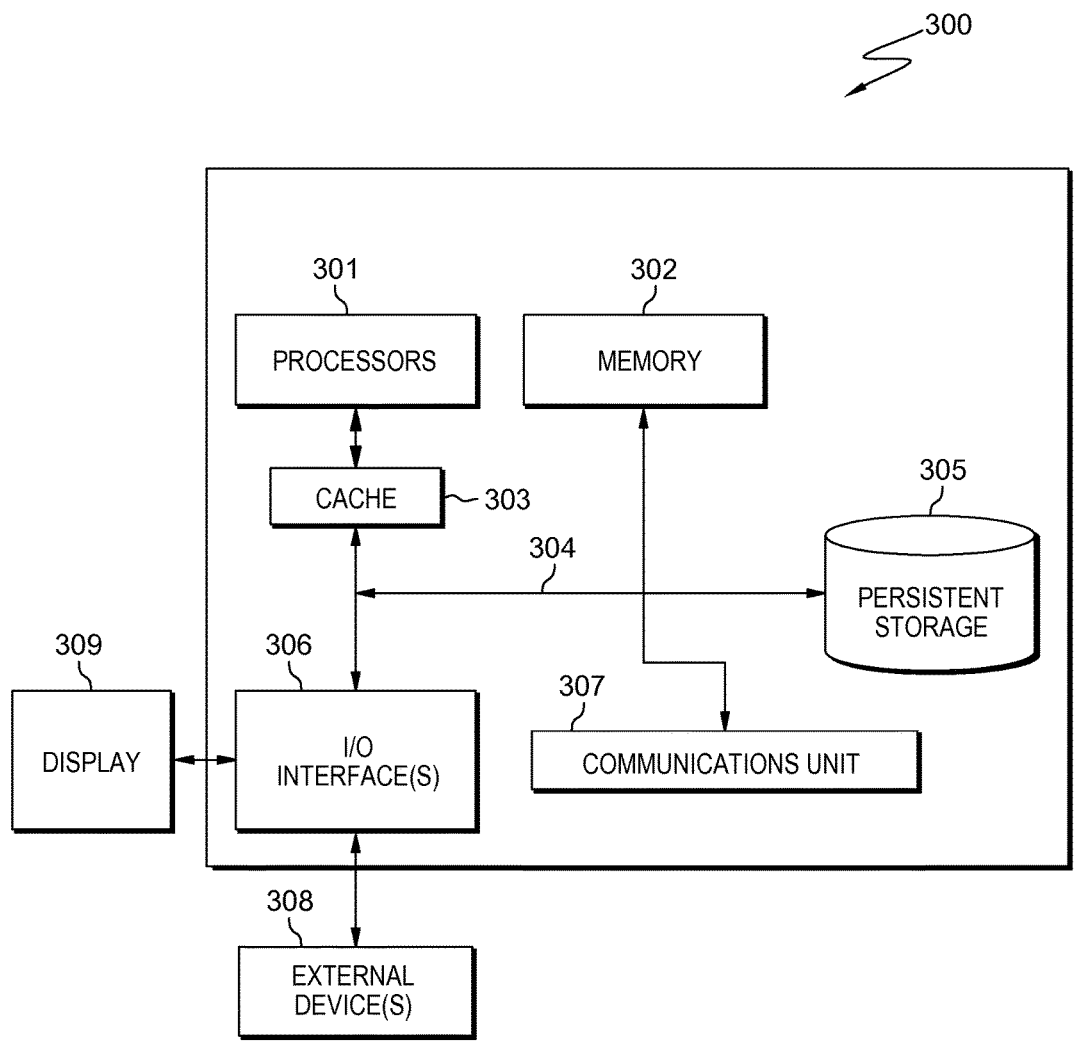
FIG. 3 depicts a block diagram of components of the server and/or the computing device of FIG. 1, in accordance with an embodiment of the present invention.

FIG. 3 depicts computer system 300, which is an example of a system that includes components of server 30 and/or computing device 40. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Functionality program 110 and usage database 120 may be downloaded to persistent storage 305 of server 30 through communications unit 307 of server 30. Application 130 and user interface 140 may be downloaded to persistent storage 305 of computing device 40 through communications unit 307 of computing device 40.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., functionality program 110 and usage database 120, can be stored on such portable computer readable storage media and can be loaded onto persistent storage 305 of server 30 via I/O interface(s) 306 of server 30. Software and data used to practice embodiments of the present invention, e.g., application 130 and user interface 140, can be stored on such portable computer readable storage media and can be loaded onto persistent storage 305 of computing device 40 via I/O interface(s) 306 of computing device 40. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for modifying a user interface for a user of an application, the method comprising:
   receiving, by one or more processors, data from a plurality of actions performed by a user of an application;
   generating, by one or more processors, a unique identifier for each action of the plurality of actions, wherein the unique identifier includes serial numbers, random numbers, and codes that are kept unique by keeping a central registry that includes the unique identifier for each action;
   generating, by one or more processors, a unique string of the generated unique identifiers for each action of the plurality of actions, wherein each action is performed in succession;
   scanning, by one or more processors, the retrieved data using natural language processing based on machine learning for related concepts of the retrieved data and structure of the retrieved data, wherein natural language processing includes parsing, optical character recognition, and sentence breaking, and wherein machine learning includes statistical machine learning, decision tree learning, association rule learning, and clustering;
   determining, by one or more processors, that a portion of a pattern of the unique string matches, within a predetermined threshold, a portion of a pattern of a history of usage of a set of users of the application;
   documenting, by one or more processors, that the portion of the pattern of the unique string of unique identifiers matches, within the predetermined threshold, the portion of the pattern of the history of usage of the set of users of the application, wherein documenting that the portion of the pattern of the unique string of unique identifiers matches, within the predetermined threshold, the portion of the pattern of the history of usage of the set of users of the application comprises:
   suggesting, by one or more processors, a documentation of the portion of the pattern of the unique string of unique identifiers that matches, within the predetermined threshold, the portion of the pattern of the history of usage of the set of users of the application by showing the user a video of a set of steps within the patterns and a choice to anonymize personally identifiable information from the plurality of actions received from the user, wherein the choice to anonymize personally identifiable information includes encrypting the personally identifiable information and removing the personally identifiable information;
   determining, by one or more processors, that the suggestion is accepted, based on an indication that the user selected the suggested documentation from an option given to the user to accept the suggested documentation; and
   generating, by one or more processors, a wiki page of the portion of the pattern of the unique string of unique identifiers that matches, within the predetermined threshold, the portion of the pattern of the history of usage of the set of users of the application; and
   modifying, by one or more processors, a user interface of the application, for the user, based on the portion of the pattern of the matched unique string, within the predetermined threshold, the portion of the pattern of the history of usage.

2. The method of claim 1, wherein the plurality of actions comprise a plurality of functions utilized by the user of the application.

3. The method of claim 1, wherein the plurality of actions comprise a plurality of entered data into the application by the user.

4. The method of claim 1, wherein determining that the portion of the pattern of the unique string of unique identifiers matches, within the predetermined threshold, the portion of the pattern of the history of usage of the set of users of the application comprises:
   determining, by one or more processors, that the portion of the pattern of the unique string of unique identifiers matches, within the predetermined threshold, the portion of the pattern of the history of usage of the set of users of the application using a minimum distance algorithm across the history of usage.

5. The method of claim 1, wherein the patterns are anti-patterns.

6. A computer program product for modifying a user interface for a user of an application, the computer program product comprising:

one or more computer readable storage media and program instructions stored on the one or more computer readable storage media, the program instructions comprising:

program instructions to receive data from a plurality of actions performed by a user of an application;

program instructions to generate a unique identifier for each action of the plurality of actions, wherein the unique identifier includes serial numbers, random numbers, and codes that are kept unique by keeping a central registry that includes the unique identifier for each action;

program instructions to generate a unique string of the generated unique identifiers for each action of the plurality of actions, wherein each action is performed in succession;

program instructions to scan the retrieved data using natural language processing based on machine learning for related concepts of the retrieved data and structure of the retrieved data, wherein natural language processing includes parsing, optical character recognition, and sentence breaking, and wherein machine learning includes statistical machine learning, decision tree learning, association rule learning, and clustering;

program instructions to determine that a portion of a pattern of the unique string matches, within a predetermined threshold, a portion of a pattern of a history of usage of a set of users of the application;

program instructions to document that the portion of the pattern of the unique string of unique identifiers matches, within the predetermined threshold, the portion of the pattern of the history of usage of the set of users of the application, wherein documenting that the portion of the pattern of the unique string of unique identifiers matches, within the predetermined threshold, the portion of the pattern of the history of usage of the set of users of the application comprises:

program instructions to suggest documentation of the portion of the pattern of the unique string of unique identifiers that matches, within the predetermined threshold, the portion of the pattern of the history of usage of the set of users of the application by showing the user a video of a set of steps within the patterns and a choice to anonymize personally identifiable information from the plurality of actions received from the user, wherein the choice to anonymize personally identifiable information includes encrypting the personally identifiable information and removing the personally identifiable information;

program instructions to determine that the suggestion is accepted, based on an indication that the user selected the suggested documentation from an option given to the user to accept the suggested documentation; and program instructions to generate a wiki page of the portion of the pattern of the unique string of unique identifiers that matches, within the predetermined threshold, the portion of the pattern of the history of usage of the set of users of the application; and program instructions to modify a user interface of the application, for the user, based on the portion of the pattern of the matched unique string, within the predetermined threshold, the portion of the pattern of the history of usage.

7. The computer program product of claim 6, wherein the plurality of actions comprise a plurality of functions utilized by the user of the application.

8. The computer program product of claim 6, wherein the plurality of actions comprise a plurality of entered data into the application by the user.

9. The computer program product of claim 6, wherein program instructions to determine that the portion of the pattern of the unique string of unique identifiers matches, within the predetermined threshold, the portion of the pattern of the history of usage of the set of users of the application comprise:

program instructions to determine that the portion of the pattern of the unique string of unique identifiers matches, within the predetermined threshold, the portion of the pattern of the history of usage of the set of users of the application using a minimum distance algorithm across the history of usage.

10. The computer program product of claim 6, wherein the patterns are anti-patterns.

11. A computer system for modifying a user interface for a user of an application, the computer system comprising:

one or more computer processors, one or more computer readable storage media, and program instructions stored on the one or more computer readable storage media for execution by at least one of the one or more computer processors, the program instructions comprising:

program instructions to receive data from a plurality of actions performed by a user of an application;

program instructions to generate a unique identifier for each action of the plurality of actions, wherein the unique identifier includes serial numbers, random numbers, and codes that are kept unique by keeping a central registry that includes the unique identifier for each action;

program instructions to generate a unique string of the generated unique identifiers for each action of the plurality of actions, wherein each action is performed in succession;

program instructions to scan the retrieved data using natural language processing based on machine learning for related concepts of the retrieved data and structure of the retrieved data, wherein natural language processing includes parsing, optical character recognition, and sentence breaking, and wherein machine learning includes statistical machine learning, decision tree learning, association rule learning, and clustering;

program instructions to determine that a portion of a pattern of the unique string matches, within a predetermined threshold, a portion of a pattern of a history of usage of a set of users of the application;

program instructions to document that the portion of the pattern of the unique string of unique identifiers matches, within the predetermined threshold, the portion of the pattern of the history of usage of the set of users of the application, wherein documenting that the portion of the pattern of the unique string of unique identifiers matches, within the predetermined threshold, the portion of the pattern of the history of usage of the set of users of the application comprises:

program instructions to suggest documentation of the portion of the pattern of the unique string of unique identifiers that matches, within the predetermined threshold, the portion of the pattern of the history of usage of the set of users of the application by showing the user a video of a set of steps within the patterns and a choice to anonymize personally identifiable information from the plurality of actions received from the user, wherein the choice to anonymize personally identifiable information includes encrypting the personally identifiable information and removing the personally identifiable information;

program instructions to determine that the suggestion is accepted, based on an indication that the user selected the suggested documentation from an option given to the user to accept the suggested documentation; and program instructions to generate a wiki page of the portion of the pattern of the unique string of unique identifiers that matches, within the predetermined threshold, the portion of the pattern of the history of usage of the set of users of the application; and program instructions to modify a user interface of the application, for the user, based on the portion of the pattern of the matched unique string, within the predetermined threshold, the portion of the pattern of the history of usage.

12. The computer system of claim 11, wherein the plurality of actions comprise a plurality of functions utilized by the user of the application.

13. The computer system of claim 11, wherein the plurality of actions comprise a plurality of entered data into the application by the user.

14. The computer system of claim 11, wherein program instructions to determine that the portion of the pattern of the unique string of unique identifiers matches, within the predetermined threshold, the portion of the pattern of the history of usage of the set of users of the application comprise:

program instructions to determine that the portion of the pattern of the unique string of unique identifiers matches, within the predetermined threshold, the portion of the pattern of the history of usage of the set of users of the application using a minimum distance algorithm across the history of usage.

* * * * *